United States Patent
Schmidt et al.

[11] Patent Number: 6,010,230
[45] Date of Patent: Jan. 4, 2000

[54] EXTENSION BRACKETS FOR RETROFIT OF METRIC LAMPING TO EXISTING FLUORESCENT LIGHTING FIXTURES

[75] Inventors: Peter Michael Schmidt, Conyers; Roger Erle Norris, Covington, both of Ga.

[73] Assignee: NSI Enterprises, Inc., Atlanta, Ga.

[21] Appl. No.: 09/016,041

[22] Filed: Jan. 30, 1998

[51] Int. Cl.[7] ........................... F21V 21/14
[52] U.S. Cl. ............................. 362/221; 362/285
[58] Field of Search ........................ 362/200, 220, 362/285

[56] References Cited

U.S. PATENT DOCUMENTS

| | | | |
|---|---|---|---|
| 2,530,017 | 11/1950 | Levenson | 362/260 X |
| 2,531,533 | 11/1950 | Shaw | 362/260 X |
| 4,229,785 | 10/1980 | Tuller | 362/217 X |
| 4,803,600 | 2/1989 | Pepping | 362/217 |
| 5,006,970 | 4/1991 | Mackiewitz | 362/217 |
| 5,469,348 | 11/1995 | Wong | 362/217 |
| 5,904,415 | 5/1999 | Robertson et al. | 362/260 |

*Primary Examiner*—Laura K. Tso
*Attorney, Agent, or Firm*—Kenneth E. Darnell

[57] ABSTRACT

Extension brackets capable of being rapidly attached to standard lampholder brackets of conventional fluorescent lighting fixtures for retrofit of such fixtures to accommodate lamping, including metric lamping such as T5 lamping, of generally shorter lengths than conventional tubular fluorescent lamping. The extension brackets of the invention attach by interference fit to standard cutouts in standard lampholder brackets, which cutouts normally attach conventional "tombstone" T12 lampholders, the extension brackets further acting to mount conventional lampholders capable of mounting the metric lamping at locations disposed inwardly of the fixtures to accommodate the several conventional lengths of metric lamping or the like while locating the metric lamping on a plane no higher than that of the conventional lamping for which the lighting fixtures are originally configured.

20 Claims, 3 Drawing Sheets

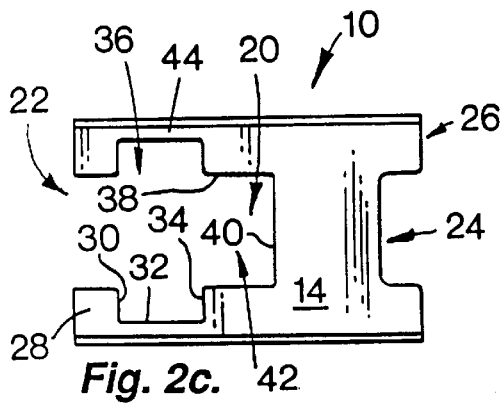
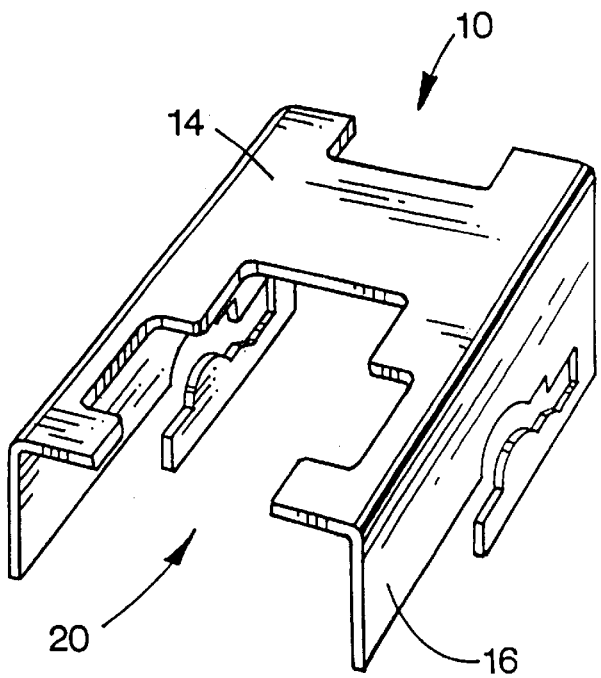
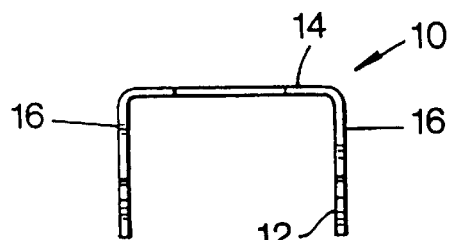
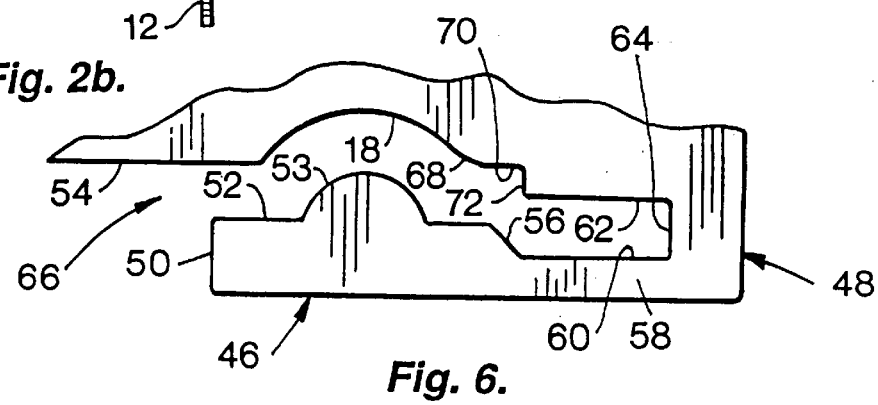

EXTENSION BRACKETS FOR RETROFIT OF METRIC LAMPING TO EXISTING FLUORESCENT LIGHTING FIXTURES

BACKGROUND OF THE INVENTION

1. Field of the Invention

The invention relates generally to apparatus for converting conventional fluorescent lighting fixtures to use with metric lamping of differing lengths and particularly to extension brackets which facilitate the use of T5 lamping in lighting fixtures intended for use with conventional T12 lamping.

2. Description of the Prior Art

Fluorescent lighting fixtures most commonly employ tubular fluorescent lamps which are of standard designation and which are commonly known as T12 lamps, these lamps typically having nominal lengths of 48 inches, 36 inches and 24 inches. Recently introduced fluorescent lamps having metric dimensions with nominal lengths of 1149 mm, 849 mm, and 549 mm exhibit favorable energy efficiencies and other characteristics which would cause a lighting engineer to consider retrofit of this lamping, known by the standard designation T5, in conventional fluorescent fixtures originally and optimally designed for use with T12 imperial fluorescent lamps. The various lengths of the T5 lamp are considerably shorter than the lengths of the standard T12 lamp sizes. The existing lamp mounting hardware of conventional fluorescent fixtures are not therefore practical for mounting of T5 lamping when considering only the respective lengths of the lamping per se. Since fluorescent lighting fixtures designed for use with T12 lamping are optimized in view of the characteristics of the T12 lamping, a retrofit must necessarily locate T5 or other lamping used in aretrofit situation in locations within the fixtures which provide the best possible photometric performance. Still further, the exigencies of a retrofit situation require accommodation of the differing lengths of T5 or such similar lamping with a minimum number of physical parts which are devoted to this purpose and which therefore must be inventoried in advance of actual assembly to conventional fixtures. The physical parts or articles of manufacture necessary to accomplish the retrofit function must also be inexpensive in addition to being few in number and must accommodate wiring which must pass into an existing lampholder bracket while adequately shielding the wiring from raw metal edges of bracket cutouts and the like.

It has previously been contemplated in the prior art to provide adapter structure for fluorescent lamping which permits fluorescent tubes of differing wattage and shorter length to be installed in lighting fixtures originally configured for use with fluorescent tubes of greater wattage and longer length. Rowe, in U.S. Pat. No. 3,993,386, provides an adapter structure capable of extending the length of a tubular fluorescent lamp. In U.S. Pat. No. 4,758,173, Northrop provides an adapter for extending "tombstone" lamp sockets to permit the use of shorter lamps in fluorescent fixtures. Coldren, in U.S. Pat. No. 5,615,943, describes brackets intended to support fluorescent lamp terminal posts and having individual lamp reflectors extending therebetween and secured to opposing pairs of the brackets for retrofitting existing lamp fixtures with fluorescent lamps and reflectors of a design which differs from those lamps and reflectors for which the fixtures were originally designed. The devices of the prior art do not provide either singly or in combination simple and inexpensive apparatus capable of the retrofit of existing fluorescent lighting fixtures with metric lamping or the like configured as a standard series of differing lengths and which further mount such lamping at an appropriate location within the retrofitted lighting fixtures to provide desirable photometric characteristics.

The present invention provides extension brackets capable of being rapidly attached to standard lampholder brackets of conventional fluorescent lighting fixtures for retrofit of such fixtures, these extension brackets accommodating metric lamping or other lamping which is of generally shorter lengths than conventional tubular T12 fluorescent lamping. The present extension brackets can be configured in two sizes which allow accommodation of the three common sizes of T5 lamping or similar lamping, the extension brackets of the invention attaching by interference fit to standard cutouts of differing configurations such as are variously formed in standard lampholder brackets. The extension brackets of the invention further act to mount conventional lampholders capable of mounting the metric lamping or the like at locations disposed inwardly of the fixtures to not only accommodate the several conventional lengths of such metric lamping but which also locate the metric lamping on a plane no higher than that of the conventional lamping for which the lighting fixtures are originally configured. The extension brackets of the invention can further be installed without effective alteration of existing hardware, thereby allowing rapid removal of the extension brackets and re-equippage of original hardware into the lighting fixtures to allow conversion back to the use of original lamping. The extension brackets of the invention are inexpensive to manufacture and inventory and extraordinarily easy to install in conventional fluorescent lighting fixtures and particularly commercial lighting fixtures utilizing conventional tubular fluorescent lamping.

SUMMARY OF THE INVENTION

The invention provides extension brackets which are easily and rapidly mountable to standard cutouts of standard lampholder brackets, said cutouts conventionally mounting lamp holders intended to mount conventional tubular fluorescent lamps such as T12 lamps. The extension brackets of the invention can be configured to retrofit lamping which can be shorter or even longer than the original lamping, the extension brackets of the invention particularly intending to retrofit existing fluorescent lighting fixtures with metric lamping such as T5 lamping which is shorter than corresponding T12 lamp sizes.

The extension brackets herein described can be rapidly assembled to conventional fluorescent lighting fixtures and can rapidly mount lampholder capable of receiving and operating metric or other lamping such as T5 lamping. The extension brackets of the invention can then be just as easily and quickly removed from fluorescent lighting fixtures with remounting of original lampholder to reconvert the fixture to use with original lamping as desired. Retrofitting of existing fluorescent lighting fixtures with the present extension brackets does not destroy any original portion of the lighting fixture or prevent in any way its renewed use with original lamping and original lampholder equipment.

The extension brackets of the invention can be formed in certain configurations for accommodation of a T5 lamp, for example, having a nominal length of 1149 mm and a T5 lamp, for example, having a nominal length of 549 mm, these two T5 lengths essentially replacing T12 lamping of nominal 48 inch and 24 inch lengths. In these situations, two each of the respective extension bracket forms are necessary to accommodate the respective lamping. With T5 lamping of a nominal length of 849 mm, one each of the two different forms of extension bracket according to the invention is necessary to accommodate this metric length which essentially replaces T12 lamping of a length of 36 inches. The extension brackets of the invention further act to mount the T5 lamping or other lamping on a plane no higher than that plane on which the original T12 lamping was located in the retrofitted fluorescent lighting fixture. Wiring to the lampholder mounted by the present extension bracket is accommodated with adequate shielding of the wiring from raw metal edges such as can exist in a standard cutout of a standard lampholder bracket.

An extension bracket configured according to the invention essentially comprises a U-shaped bracket element having a cutout portion in the bight portion of the bracket at an inward end, this cutout portion being configured to facilitate mounting of a replacement lampholder capable of mounting the retrofit lamping such as a T5 metric lamp. According to the invention, the retrofit lampholder is mounted to the extension bracket rather than to the standard lampholder bracket which is typically mounted to a standard cutout of the conventional lampholder bracket. The extension bracket includes structure at its outward end which cooperates with standard cutouts in conventional lampholder brackets of conventional fluorescent lighting fixtures to attach the extension bracket to the standard lampholder bracket by means of an interference fit, the extension bracket being quickly and easily attached to the standard lampholder bracket or removed therefrom.

The present extension brackets can be manufactured at low cost with conventional stamping and bending equipment and need only be inventoried in two different forms for accommodation of a series of differing lengths of retrofit lamping such as T5 metric lamping. The extension brackets of the invention thus provide inexpensive articles of manufacture which permit the retrofit of conventional fluorescent lighting fixtures with lamping of differing lengths from the lengths of lamping for which the fixtures were originally designed, the brackets of the invention further providing favorable photometric characteristics for the retrofitted lighting fixtures by virtue of favorable location of the retrofitted lamping within the lighting fixtures.

Accordingly, it is a primary object of the invention to provide extension brackets capable of being rapidly attached to standard lampholder brackets of conventional fluorescent lighting fixtures for retrofit of such fixtures to accommodate lamping of differing lengths from that lamping for which the lighting fixtures were originally designed.

It is another object of the invention to provide extension brackets of appropriate sizing which allows accommodation of a series of retrofit lamps having different lengths which can be accommodated within conventional lighting fixtures originally designed for lamping of lengths which differ from those lengths of the retrofit lamping.

It is a further object of the invention to provide extension brackets capable of retrofitting conventional fluorescent lighting fixtures with lamping of lengths differing from the lamping for which the fixtures were originally designed, the extension brackets being readily and easily removable from the fixtures to allow reconversion of the fixtures to use with original lamping.

Further objects and advantages of the invention will become more readily apparent in light of the following detailed description of the preferred embodiments.

BRIEF DESCRIPTION OF THE DRAWINGS

FIG. 1 is a perspective view of an extension bracket configured according to the invention;

FIG. 2A is a side elevational view of an extension bracket configured according to the invention;

FIG. 2A is a front elevational view of the extension bracket of FIG. 2A;

FIG. 2C is a plan view of the extension bracket of FIG. 2A;

DESCRIPTION OF THE PREFERRED EMBODIMENT

Figure 3:
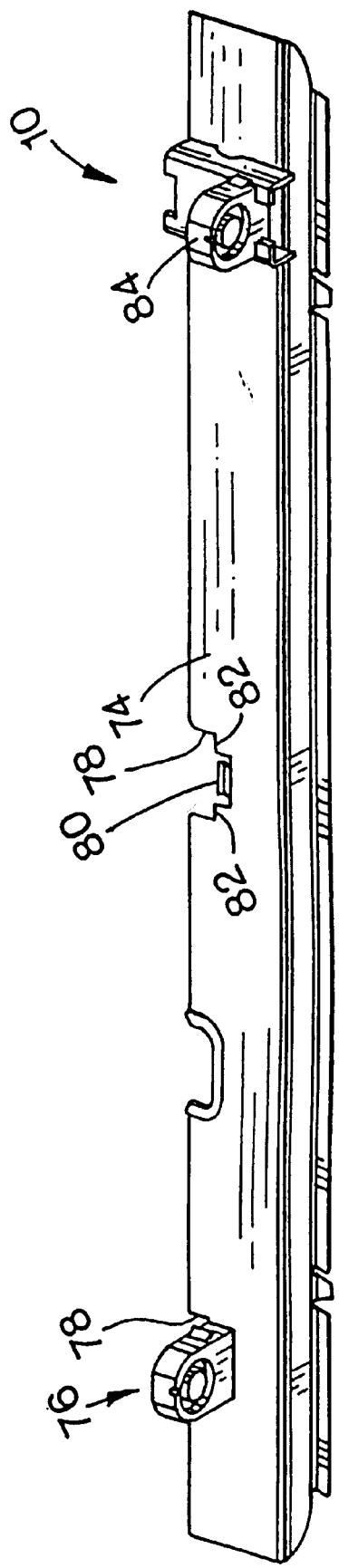
FIG. 3 is a perspective view of a standard lamp holder bracket having an extension bracket and retrofit lampholder mounted thereto and further showing a conventional lampholder configured for original equipment with the standard lampholder bracket and illustrating the location of attachment thereof with the standard lampholder bracket.

Referring now to the drawings and particularly to FIGS. 1 and 2 inclusive, an extension bracket configured according to the invention is shown generally at 10 to comprise a U-shaped frame 12 having a top wall 14 and essentially identical side walls 16. The bracket 10 is preferably stamped from a suitable metal having a suitable thickness which imparts rigidity to the bracket 10. Flat metal stock of a thickness of 18 gauge or the like is considered to be suitable. Each of the side walls 16 are substantially rectangular in shape and have an arcuate notch 18 formed along a lower edge thereof essentially medially of the length thereof. Upper edges of the side wall 16 round to join with the top wall 14. The top wall 14 is formed with a cruciform cutout 20 at a first end 22 of the bracket 10. A substantially rectangular cutout 24 is formed in the top wall 14 at a second end 26 of the bracket 10. Corners of the cutout 24 can be radiused so that the corners of the cutout 24 will not bind insulated wiring which extends into the cutout 24 as will be described hereinafter.

Side tab elements 28 which are essentially identical in shape and structure partially define the cruciform cutout 20 formed in the top wall 14. Inwardly disposed edges 30 of the elements 28 in cooperation with lateral edges 32 of the top wall 14 and facing edges 34 of the wall 14 define a lateral, substantially rectangular notch 36 on each side of the bracket 10, the notches 36 essentially defining arm-like portions of the cruciform cutout 20. Edges 38 which extend inwardly of the notches 36 are joined by an edge 40 of the top wall 14 to complete definition of the cruciform cutout 20 and particularly to form a substantially rectangular notch 42 which can have radiused corners for the same reason as the corners of the cutout 24 can be radiused, that is, to prevent binding of insulated wiring which extends into the notch 42. Lateral walls 44 form a portion of the top wall 14 between each of the notches 36 and the rounded junctures between the side walls 16 and the top wall 14.

Figure 4:
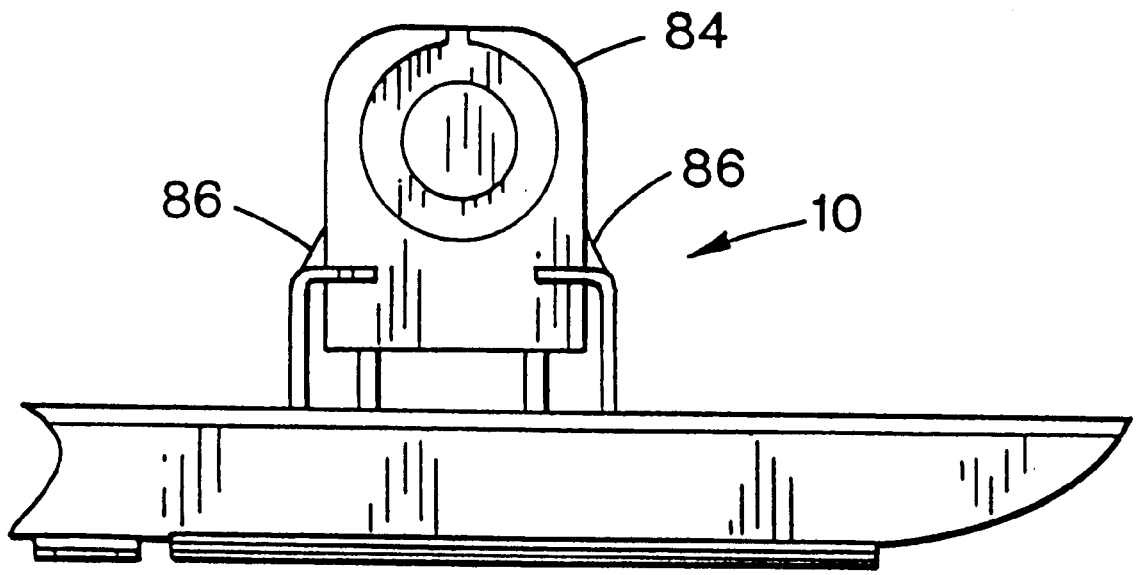
FIG. 4 is a front elevational view of a portion of the structure of FIG. 3, that portion including an extension bracket configured according to the invention and mounted to the standard lampholder bracket with the extension bracket further mounting a lampholder which is retrofit with lamping other than the lamping for which a conventional fluorescent lighting fixture utilizing the standard lampholder bracket was designed.
Figure 5:
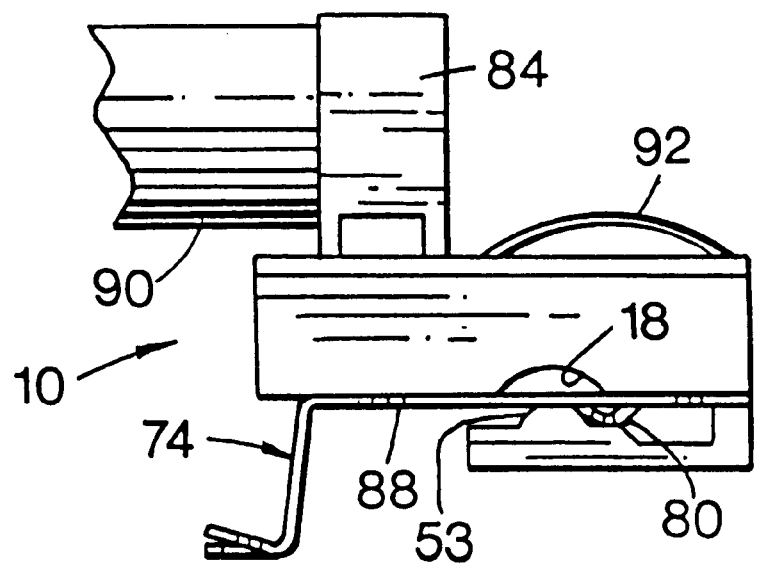
FIG. 5 is a side elevational view of the extension bracket according to the invention mounted to a standard lampholder bracket shown in end elevation and with a detail of the retrofit lamping mounted to a retrofit lampholder mounted to the extension bracket of the invention; and, FIG. 6 is a detail view of a portion of the extension bracket which provides an interference fit with a standard cutout of the standard lampholder bracket.

As will be described in more detail hereinafter, the substantially rectangular opening provided by the two notches 36 and that portion of the cruciform cutout 20 lying therebetween, is dimensioned to receive from underneath the bracket 10 a lampholder (as is shown in FIGS. 3 through 5) for snap attachment to the bracket 10.

Referring again particularly to FIG. 2A and to FIG. 6, each of the side walls 16 are seen to be provided with leg elements 46 which connect by means of a shoulder element 48 to the main body of each of the side walls 16. Distal end 50 of each leg element 46 is essentially squared off, outer portions of the leg elements 46 substantially having rectangular conformations. Inward edge 52 of each leg element 46 is substantially parallel with lower edge 54 of the side wall 16, an arcuate boss element 53 extending from the edge 52 of each leg element 46 and toward rear portions of the arcuate notches 18 formed in the side walls 16. The inward edge 52 of each of the leg elements 46 extends obliquely at 56 to form a reduced-in-thickness portion 58 of each of the leg elements 48. The portions 58 of said leg elements 46 connect to the respective shoulder elements 48, an inner edge 60 of each portion 58 defining with respective oppositely facing edges 62 of the side wall 16 and perpendicular edge 64 a substantially rectangular cutout portion of a complex cutout seen generally at 66 which is defined between the body of each of the side walls 16 and each of the respective leg elements 46 and shoulder elements 48. Definition of the contours of the complex cutout 66 is also provided by a rounded edge 68 located at the rear extent of the notch 18, lower edges 70 disposed rearwardly of the rounded edges 68 essentially being straight edges which are substantially parallel to opposing inward edges 52 of the leg elements 46. A squared off shoulder is formed in each of the lower edges 70 at 72 to serve as a detent as will be described hereinafter.

Referring now also to FIGS. 3 through 5, a standard lampholder bracket is seen at 74, the bracket 74 being one example of literally hundreds of extremely similar lampholder brackets such as are used in conventional fluorescent lighting fixtures (not shown). In a conventional lighting fixture, two of the brackets 74 are utilized, one each of the brackets 74 being located at each end of the fixture with each of the brackets 74 mounting standard polymeric "tombstone" lampholders such as is seen at 76. The lampholders 76 fit into standard cutouts 78 formed in the lampholder brackets 74, the bracket 74 of FIGS. 3 through 5 being seen to be formed with three of the cutouts 78. In a usual situation, each of the three standard cutouts 78 would be provided with one of the standard lampholders 76 with the lampholders 76 facing inwardly toward a second, similarly configured lampholder bracket such as the bracket 74 so that standard, tubular lamping (not shown) could be mounted between the spaced sets of the standard lampholders 76. As is common in the lighting arts, the arrangement just described intends the mounting of T12 fluorescent tubular lamps, the brackets 74 being part of a lighting fixture arrangement capable of mounting three such T12 lamps.

As seen best in FIGS. 3 and 5, the standard cutouts 78 are seen to be T-shaped with an arcuate tab 80 extending below the plane of that portion of the bracket 74 in which the cutout 78 is formed, the arcuate tab 80 extending from an inward edge of the leg of the T-shaped cutout 78 with arcuate portions of the tab 80 effectively lying beneath the said plane. The nature and conformation of the arcuate tab 80 can vary depending upon individual structures of the bracket 74. However, the contours of the cutouts 78 are typically very similar particularly as having spaced shoulders 82 on either side of the tab 80, the shoulders 82 effectively defining a reduced portion of the cutout 78 inwardly of the "arms" of the cutout 78.

The standard lampholder 76 is seen to snap-fit into the standard cutout 78, lower arcuate portions of the tab 80 as can be seen in FIG. 5 typically biasing against an upper surface of a base of the lampholder 76 and snapping thereonto in a known manner. The standard lampholder 76 can be quickly and easily attached to the standard lampholder bracket 74 and can just as easily be removed therefrom. Conversion of a conventional fluorescent lighting fixture (not shown) such as utilizes T12 lamping mounted by the bracket 74 and lampholder 76 to use with lamping of different types such as is shorter in length is accomplished by first removing the lampholder 76 from the bracket 74, it being understood that two of the brackets 74 are mounted in oppositely facing relation to each other within the lighting fixture (not shown). A lampholder 84 capable of mounting the lamping, such as T5 lamping, which is to be retrofitted into the lighting fixture (not shown) has side tabs 86 which extend from each side of the tombstone-shaped lampholder 84, lower portions of the side tabs 86 being serrated (not shown) in a conventional manner. The lampholder 84 is understood to be a conventional lampholder intended for mounting of the lamping, such as T5 metric lamping, which is being retrofit into a lighting fixture of which the standard lampholder bracket 74 is a part. The lampholder 84 is typically formed of a polycarbonate material as opposed to use of a polymeric, thermosetting material as with the lampholder 76.

The retrofit lampholder 84 is attached to the extension bracket 68 by pushing the lampholder 84, top side up, into and through the underside of the bracket 10 immediately below the rectangular notches 36, the notches 36 being sized and spaced apart across the cruciform cutout 20 as indicated above and dimensioned to receive the lampholder 84 therethrough, the side tabs 86 acting in a ramp-like fashion to engage the lateral edges 32 of the wall 14 and to snap-fit onto the bracket 10 on passage of lower portions of the tabs 86 through the respective notches 36, serrations (not shown) formed in lowermost edges of the tabs 86 facilitating the mounting of the retrofit lampholder 84 to the extension bracket 10.

The extension bracket 10, now mounting the retrofit lampholder 84, is then brought into engagement with one of the standard cutouts 78 formed in the standard lampholder bracket 74 with the leg elements 46 of the bracket 10 fitting beneath body portion 88 of the bracket 74 and with major portions of the bracket 10 fitting above the body portion 88. The extension bracket 10 is then caused to slide onto the bracket 74 with the uppermost edge portions of the arcuate tab element 53 contacting the underside of the body portion 88, lower edges of the side walls16, such as the lower edges 54 and 70,biasing against upper surfaces of the body portion 88. An interference fit is thus formed which holds the extension bracket 10 in place at the location of each of the standard cutouts 78 formed in the standard lampholder bracket 74.

One of the extension brackets 10 seen mounting one of the retrofit lampholders 84 on the standard lampholder bracket 74 is seen particularly in FIGS. 3 and 4. FIG. 5 further illustrates a portion of a retrofit lamp 90, which can be a metric T5 lamp, connected to the retrofit lampholder 84. Wiring 92 can be brought from a location rearwardly of the bracket 10 and from underneath the lampholder bracket 74 to pass through the cutout 24 and downwardly into the interior of the bracket 10 through the notch 42. The notches 24 and 37 can be radiused as aforesaid in order to prevent binding of polymeric insulation covering the wiring 92.

The complex cutouts 66 defined by lower edge portions of the side walls 16 and facing edge portions of the leg elements 46 function to provide clearance during fitting of the bracket 10 to the bracket 74, the cutouts 66 particularly being open in the vicinity of the edge 64 of the shoulder element 48 so that the leg elements 46 have an inherent "spring-like" action which facilitates the interference fit between the bracket 10 and the bracket 74. The shoulders 72 effectively serve as detents or locater elements which prevent the extension bracket 10 from being pushed too far onto the standard lampholder bracket 74. Once the shoulders 72 engage a desired portion of the bracket 74, such as the distal end of the tab 80, then the bracket 10 is known to be appropriately located on the bracket 74 at a spacing from one of the brackets 74 at the opposite end of the fixture (not shown) for mounting of the retrofit lamping.

The extension brackets 10 of the invention are intended to mount lamping which is shorter than the lamping originally intended for the lighting fixture (not shown) which is being retrofit or converted to use with shorter lamping such as metric T5 lamping. It is to be understood that, space permitting, bracket structure similar to the extension bracket 10 can be utilized to mount lamping of a greater length than original lamping for which a given lighting fixture is desired.

Metric lamping such as T5 lamping is provided to the market in differing sizes, these sizes conventionally being 1149 mm, 849 mm and 549 mm. The extension brackets 10 shown herein are intended to mount the 1149 mm lamps by virtue of having a length from the second end 26 to the edge 34 of 0.972 inch. Extension brackets having identical features but of slightly different lengths from the second end 26 to the edge 34 are intended for mounting of the 549 mm lamps. A length of 0.783 inch is necessary for mounting of the 549 mm lamps. It is to be understood that a pair of the extension brackets 10 are required for mounting of one of the respective lamps. An 849 mm T5 metric lamp can be accommodated according to the invention with the use of one of the brackets used for mounting of an 1149 mm lamp and one of the brackets intended for mounting of a 549 mm lamp. The brackets themselves may be of differing lengths to accommodate lamping of differing lengths. The brackets 10, regardless of the length of the lamps being mounted, are configured to place the top of a T5 lamp, in particular, on a plane no higher than that plane at which the top of a T12 lamp is located, thereby providing desirable photometric performance of the retrofit T5 lamp in a lighting fixture originally designed for T12 lamping.

Accordingly, it is to be understood that the retrofit apparatus of the invention can be configured structurally to mount a retrofit lampholder capable of mounting lamping which is to be retrofitted to a conventional fluorescent lighting fixture, the invention further providing for mounting of the retrofit lampholder in a desirable location relative to and mounted by a standard lampholder bracket such as at the location of a standard cutout formed in standard lampholder brackets. The invention can further be used for retrofit of lighting fixtures which normally use T8 lamping in a manner essentially identical to the description herein provided relative to retrofit of T12 lamping. It is therefore to be realized that the invention can be configured other than as explicitly shown herein, the invention being effectively defined by the scope of the appended claims.

What is claimed is:

1. An article of manufacture for conversion of a conventional lighting fixture to use with retrofit lamping of differing lengths relative to lamping for which the fixture is originally configured, said fixture having at least one lampholder bracket originally configured to mount at least one lampholder intended for use with the original lamping, the retrofit lamping being mountable by a retrofit lampholder, comprising:

bracket means for attachment to the lampholder bracket; and, mounting means carried by the bracket means for mounting the retrofit lampholder at a location within the lighting fixture.

2. The article of claim 1 wherein the lampholder bracket is formed with structure capable of mounting at least one of the original lampholders, the bracket means comprising means carried by the bracket means for attachment to said structure formed with the lampholder bracket.

3. The article of claim 2 wherein the structure formed with the lampholder bracket comprises a cutout formed in a body portion of the lampholder bracket.

4. The article of claim 2 wherein the bracket means comprise a body portion having depending side walls, each of the side walls extending from laterally spaced edges of the body portion, the attachment means comprising leg elements extending one each from each of the side walls and in the same direction therefrom, a protrusion extending from each of the leg elements toward each said side wall, lower edges of each side wall and edges of each leg element defining cutouts, each cutout being open at distal ends of the leg elements for receiving a portion of the lampholder bracket therein, at least portions of the lower edges of each side wall and at least portions of the protrusion on each of the leg elements respectively biasing against opposing surfaces of the portion of the lampholder bracket to provide an interference fit of the bracket means with the structure of the lampholder bracket.

5. The article of claim 4 and further comprising means for locating the bracket means on the lampholder bracket.

6. The article of claim 5 wherein the locating means comprises a shoulder formed in a lower edge of each of the side walls, the shoulder particularly defining the cutout between each of the side walls and the leg element formed therewith, a portion of the lampholder bracket engaging each of the shoulders when the bracket means is located at a desired relation with the lampholder bracket.

7. The article of claim 1 wherein the bracket means comprise a top wall and side walls depending from lateral edges of the top wall, the top wall having a cruciform cutout formed therein at a first end of the bracket means, the cutout being open at the first end of the bracket means, spaced arms of the cutout providing with open body portions of the cutout a space into which the retrofit bracket can be inserted to fit thereinto and be mounted by the bracket means for mounting of the retrofit lamping at a desired location within the lighting fixture.

8. The article of claim 7 wherein the top wall has a wiring accommodation cutout formed at a second end thereof, the wiring accommodation cutout receiving wiring therethrough for connection to the retrofit lampholder, at least a portion of the cruciform cutout being capable of receiving wiring therethrough for connection to the retrofit lampholder.

9. The article of claim 1 wherein the bracket means comprise a top wall having a cutout formed therein for receiving the retrofit bracket therein and for mounting of said retrofit bracket at a desired location within the lighting fixture.

10. The article of claim 1 wherein the retrofit lamping is formed in differing lengths, the bracket means having differing lengthwise dimensions for accommodating the differing lengths of the retrofit lamping, at least certain of the lengths of the retrofit lamping being mounted by one each of the bracket means of differing lengthwise dimensions.

11. An article of manufacture for conversion of a conventional lighting fixture to use with retrofit lamping of differing lengths relative to lamping for which the fixture is originally configured, said fixture being configured to mount at least one lampholder intended for use with the lamping for which the fixture is originally configured, the retrofit lamping being mountable by a retrofit lamp holder, comprising:

bracket means for attachment to the fixture; and, mounting means carried by the bracket means for mounting the retrofit lampholder at a location within the lighting fixture to mount the retrofit lamping for favorable photometric performance.

12. The article of claim 11 wherein the dimensions of the bracket means are configured to mount the retrofit lampholder at a location within the lighting fixture to mount the retrofit lamping for favorable photometric performance.

13. The article of claim 11 wherein the bracket means comprise a top wall and side walls depending from lateral edges of the top wall, the top wall having a cruciform cutout formed therein at a first end of the bracket means, the cutout being open at the first end of the bracket means, spaced arms of the cutout providing with open body portions of the cutout a space within which the retrofit bracket can be inserted to fit thereinto and be mounted by the bracket means for mounting of the retrofit lamping at a desired location within the lighting fixture.

14. The article of claim 13 wherein the top wall has a wiring accommodation cutout formed at a second end thereof, the wiring accommodation cutout receiving wiring therethrough for connection to the retrofit lampholder, at least a portion of the cruciform cutout being capable of receiving wiring therethrough for connection to the retrofit lampholder.

15. The article of claim 11 wherein the bracket means comprise a top wall having a cutout formed therein for receiving the retrofit bracket therein and for mounting of said retrofit bracket at a desired location within the lighting fixture.

16. The article of claim 11 wherein the retrofit lamping is formed in differing lengths, the bracket means having differing lengthwise dimensions for accommodating the differing lengths of the retrofit lamping, at least certain of the lengths of the retrofit lamping being mounted by one each of the bracket means of differing lengthwise dimension.

17. The article of claim 11 wherein the bracket means have a heightwise dimension for mounting of the retrofit lamping at a desired location within the lighting fixture.

18. The article of claim 11 wherein the retrofit lamping is formed in differing dimensions, the bracket means having differing dimensions for accommodating the differing dimensions of the retrofit lamping.

19. The article of claim 18 wherein the retrofit lamping is formed in differing lengths, the bracket means having differing lengthwise dimensions for accommodating the differing lengths of the retrofit lamping, at least certain of the lengths of the retrofit lamping being mounted by one each of the bracket means of differing lengthwise dimensions.

20. The article of claim 19 wherein the bracket means have a heightwise dimension for mounting of the retrofit lamping at a desired location within the lighting fixture.

* * * * *